(12) United States Patent
Jaffar et al.

(10) Patent No.: US 12,033,212 B2
(45) Date of Patent: Jul. 9, 2024

(54) SYSTEMS AND METHODS FOR NON-INTRUSIVE MONITORING OF INTRA-PROCESS LATENCY OF APPLICATION

(71) Applicant: CITIGROUP TECHNOLOGY, INC., New York, NY (US)

(72) Inventors: Mohsin Jaffar, Bridgewater, NJ (US); Jeremy York, New York, NY (US); Zoltan Thoma, Toronto (CA); Anthony Frederick John Warden, St Albans (GB); Daniel Shaya, Middlesex (GB); Richard John Thompson, Ipswich (GB); James Slaughter, Welling (GB)

(73) Assignee: CITIGROUP TECHNOLOGY, INC., New York, NY (US)

( * ) Notice: Subject to any disclaimer, the term of this patent is extended or adjusted under 35 U.S.C. 154(b) by 452 days.

(21) Appl. No.: 17/342,225

(22) Filed: Jun. 8, 2021

(65) Prior Publication Data
US 2022/0391977 A1    Dec. 8, 2022

(51) Int. Cl.
| | |
|---|---|
| *G06F 11/34* | (2006.01) |
| *G06F 11/30* | (2006.01) |
| *G06F 11/32* | (2006.01) |
| *G06Q 40/04* | (2012.01) |

(52) U.S. Cl.
CPC ........... *G06Q 40/04* (2013.01); *G06F 11/302* (2013.01); *G06F 11/327* (2013.01); *G06F 11/3419* (2013.01)

(58) Field of Classification Search
CPC ..... G06Q 40/04; G06F 11/302; G06F 11/327; G06F 11/3419

USPC ......................................................... 370/252
See application file for complete search history.

(56) References Cited

U.S. PATENT DOCUMENTS

| | | | |
|---|---|---|---|
| 7,386,613 B2* | 6/2008 | Piccirilli | ............... H04L 43/062 709/224 |
| 2005/0055439 A1 | 3/2005 | Piccirilli et al. | |
| 2017/0317944 A1* | 11/2017 | John | ...................... H04L 67/00 |

FOREIGN PATENT DOCUMENTS

EP    3 467 660 A2    4/2019

OTHER PUBLICATIONS

Foreign Search Report on EP Appl. Ser. No 22177223.9 dated Nov. 10, 2022 (8 pages).

\* cited by examiner

*Primary Examiner* — Gbemileke J Onamuti
(74) *Attorney, Agent, or Firm* — Foley & Lardner LLP

(57) ABSTRACT

A system measures, by executing a monitoring process, first metric data associated with trade data at a first time point after the trade data is output by a first process of an application and before the trade data is input to a second process of the application, identifies the trade data at a second time point after the trade data is output by the second process and before the trade data is output by the application, measures second metric data associated with the trade data identified at the second time point, and sends, in response to a latency value obtained based on the first metric data or the second metric data exceeding a latency threshold, a latency alert to a user computing device associated with the application. The monitoring process is not a process of the application and is not linked with the first process or the second process.

20 Claims, 7 Drawing Sheets

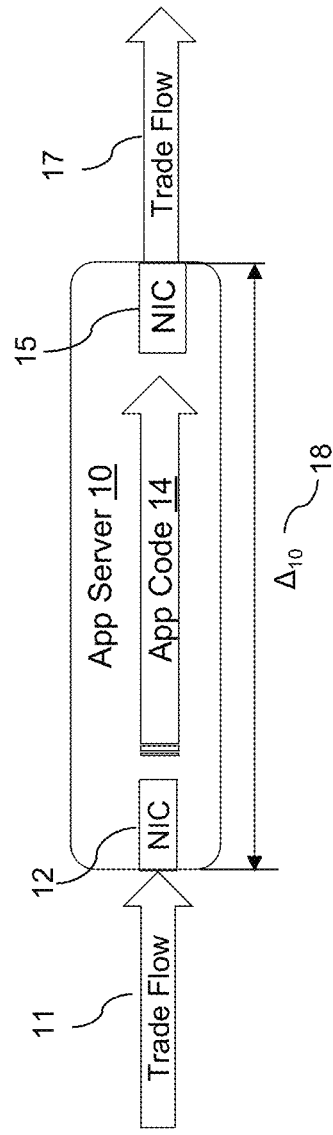
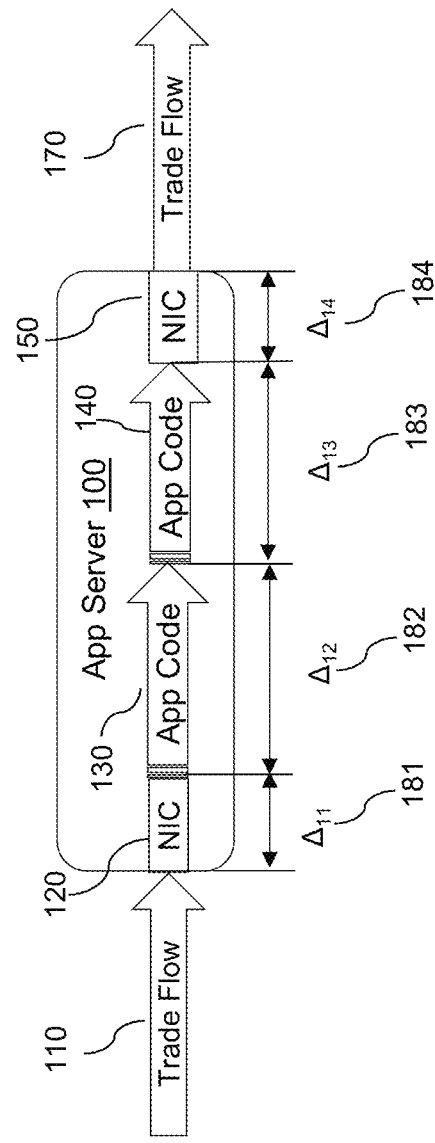
Fig. 1A (Prior Art)
Fig. 1B

| Timestamp | Message Type | Latency Δ | | | | | | |
|---|---|---|---|---|---|---|---|---|
| t1 | New Order | | | | | | | |
| t2 | | $\Delta_{31}$ | 0.108902 | | | | | |
| t3 | | $\Delta_{32}$ | | 0.000992 | | | | |
| t4 | | $\Delta_{33}$ | | | 0.092867 | | | |
| t5 | | $\Delta_{34}$ | | | | 0.000922 | | |
| t6 | | $\Delta_{35}$ | | | | | 0.159735 | |
| Totals (ms) | | 0.370713 | 0.108902 | 0.000992 | 0.092867 | 0.000922 | 0.159735 | 0.007295 |

Fig. 6

SYSTEMS AND METHODS FOR NON-INTRUSIVE MONITORING OF INTRA-PROCESS LATENCY OF APPLICATION

TECHNICAL FIELD

This application is generally directed towards a performance monitoring system, and more specifically towards systems and methods for monitoring intra-process latencies of an application by accessing queues within the application.

BACKGROUND

In an algorithmic trading environment, it is important to provide more precise timing of receiving messages from clients (for example, algorithmic trading clients), making a decision to trade, and transmitting orders to a market (e.g., trading venues). Precise timing of processing a message in an application server is also important for identifying a latency bottleneck (or a latency hotspot or an outlier) in the application server so that the problem can be timely fixed. Precise timing of processing a message in the server is also useful for monitoring latencies of the server in real time or improving the performance of the server using a latency profile of the server.

One way to provide precise timing is a wire-to-wire latency measurement, which is a latency measurement of a packet or a message as it enters and leaves an application server through a network card. A wire-to-wire latency measurement allows to measure performance of an application server, for examples, a market data feed handler, a trading algorithms/orders router, or a market access server, etc. A wire-to-wire latency measurement can provide latency analytics of the server only. For example, in FIG. 1A, a wire-to-wire latency measurement can provide a latency $\Delta_1$ (18) of an application server 10, which is measured between a timestamp of an ingress trading flow 11 at a network interface card (NIC) 12 and a timestamp of an egress trading flow 17 at a NIC 16. The latency $\Delta_1$ includes a latency of an application code 14.

In the algorithmic trading environment, a distributed programming platform can be utilized which can automatically handle failure so that the developer can concentrate on the core logic of applications. Such a distributed programming platform can adopt a service oriented architecture (SOA) or a microservices-based architecture. A microservices-based programming platform can be utilized with emphasis on low latent and deterministic performance which can also automatically handle failure so that the developer can concentrate on the core logic of applications. In a microservices-based architecture, specialized services provide distinct functions within an application pod functioning as a complete standalone application which is resilient and scalable. In a microservices-based architecture, a high-performance application can be implemented using a low-latency message framework, such as a service queue. Such a low-latency message framework can support transparent and concurrent access to data (in a queue, for example) for a service in a given application pod. For example, a service queue is a persisted queue for messaging and logging, providing a transitionary place holder for messages as they are passed and used to write app data and logs from service to service.

In the algorithmic trading environment, for precise latency measurements, a low latency implementation of measurements can help the operations of trading systems.

There is a need for a low latency measurement system implemented in an SOA-based programming platform or a microservices-based programming platform using a low-latency message framework.

SUMMARY

Disclosed herein are systems and methods capable of addressing the above described shortcomings and may also provide any number of additional or alternative benefits and advantages. Embodiments described herein provide for systems and methods that monitor intra-process latencies of an application by accessing queues within the application.

In an embodiment, a method of monitoring latency of an application while one or more processes of the application are executed to process trade data that is input to the application, may include measuring, by one or more processors executing a monitoring process, first metric data associated with first trade data at a first time point after the first trade data is output by a first process of the application and before the first trade data is input to a second process of the application. The method may include identifying, by the one or more processors executing the monitoring process, the first trade data at a second time point after the first trade data is output by the second process of the application and before the first trade data is output by the application. The method may include in response to identifying the first trade data at the second time point, measuring, by the processor executing the monitoring process, second metric data associated with the first trade data identified at the second time point. The method may include sending, in response to a latency value obtained based on the first metric data or the second metric data exceeding a latency threshold, a latency alert to a user computing device associated with the application. The monitoring process is not a process of the application and is not linked with the first process or the second process.

In another embodiment, a system for monitoring latency of an application while one or more processes of the application are executed to process trade data that is input to the application, may include a memory including non-transitory machine-readable storage, and one or more processors. The one or more processors may be configured to measure, by executing a monitoring process, first metric data associated with first trade data at a first time point after the first trade data is output by a first process of the application and before the first trade data is input to a second process of the application. The one or more processors may be configured to identify, by executing the monitoring process, the first trade data at a second time point after the first trade data is output by the second process of the application and before the first trade data is output by the application. The one or more processors may be configured to in response to identifying the first trade data at the second time point, measure, by executing the monitoring process, second metric data associated with the first trade data identified at the second time point. The one or more processors may be configured to send, in response to a latency value obtained based on the first metric data or the second metric data exceeding a latency threshold, a latency alert to a user computing device associated with the application. The monitoring process is not a process of the application and is not linked with the first process or the second process.

In yet another embodiment, a non-transitory computer readable medium may store program instructions configured to be executed by one or more processors. The program instructions may be configured to be executed by the one or more processors to measure, by executing a monitoring process, first metric data associated with first trade data at a first time point after the first trade data is output by a first process of the application and before the first trade data is input to a second process of the application. The program instructions may be configured to be executed by the one or more processors to identify, by executing the monitoring process, the first trade data at a second time point after the first trade data is output by the second process of the application and before the first trade data is output by the application. The program instructions may be configured to be executed by the one or more processors to in response to identifying the first trade data at the second time point, measure, by executing the monitoring process, second metric data associated with the first trade data identified at the second time point. The program instructions may be configured to be executed by the one or more processors to send, in response to a latency value obtained based on the first metric data or the second metric data exceeding a latency threshold, a latency alert to a user computing device associated with the application. The monitoring process is not a process of the application and is not linked with the first process or the second process.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate an embodiment of the subject matter described herein.

FIG. 1A is a block diagram depicting an example wire-to-wire latency measurement.

FIG. 1B is a block diagram depicting an example wire-to-application-to-wire latency measurement, according to some embodiments.

FIG. 6 is a diagram showing an example chronological event view obtained by the analytics system of FIG. 5, according to some embodiments.

DETAILED DESCRIPTION

Figure 2:
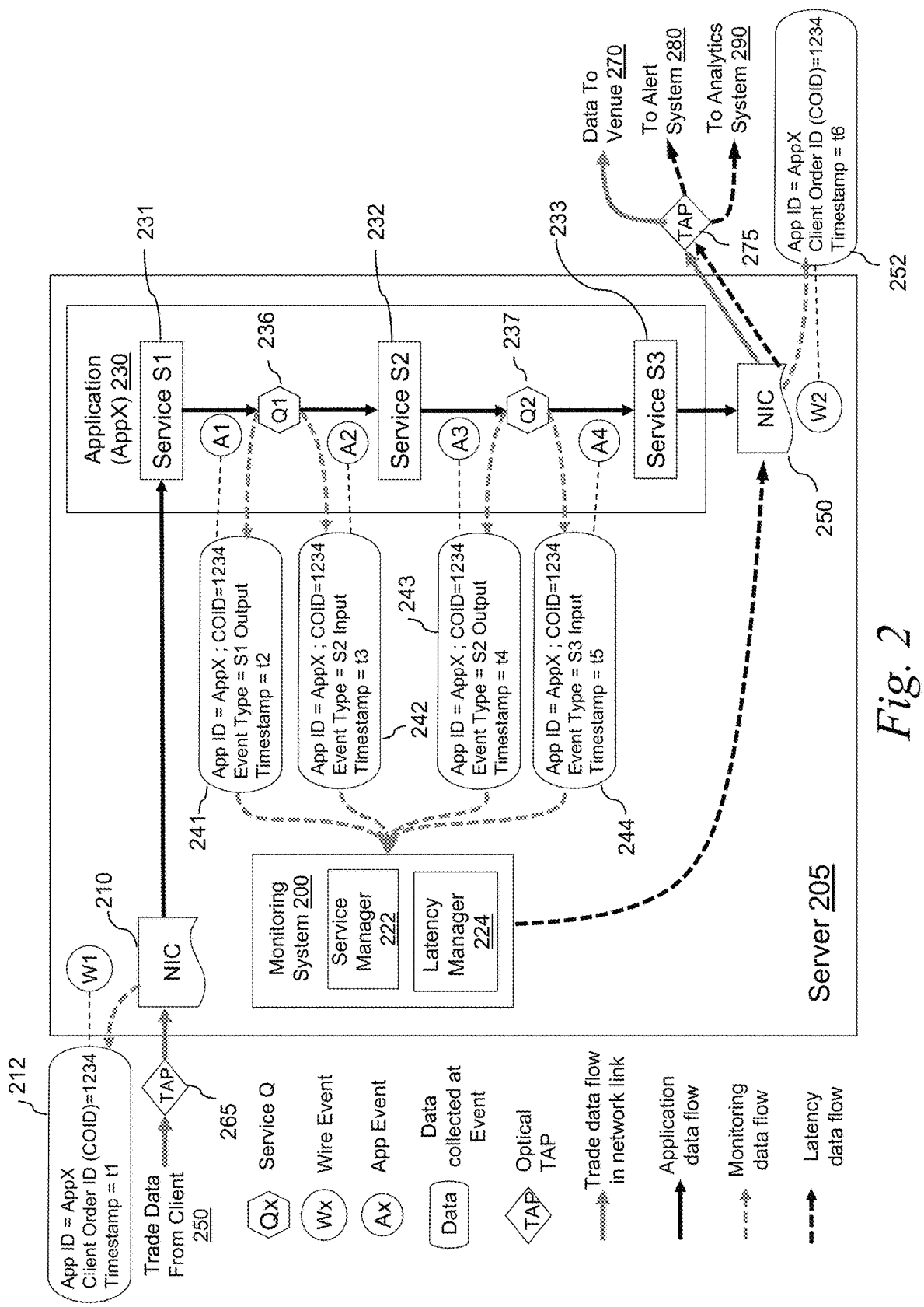
FIG. 2 is a block diagram showing operations of a monitoring system for obtaining intra-process latencies of an application, according to some embodiments.

Reference will now be made to the illustrative embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

Embodiments disclosed herein generally relate to systems and methods for monitoring intra-process latencies of an application by accessing service queues within the application. Embodiments disclosed herein describe a system for monitoring latency of an application while one or more processes of the application are executed to process trade data that is input to the application. The system may include a memory including non-transitory machine-readable storage, and one or more processors. The one or more processors may be configured to measure, by executing a monitoring process, first metric data associated with first trade data at a first time point after the first trade data is output by a first process of the application and before the first trade data is input to a second process of the application. The one or more processors may be configured to identify, by executing the monitoring process, the first trade data at a second time point after the first trade data is output by the second process of the application and before the first trade data is output by the application. The one or more processors may be configured to in response to identifying the first trade data at the second time point, measure, by executing the monitoring process, second metric data associated with the first trade data identified at the second time point. The one or more processors may be configured to send, in response to a latency value obtained based on the first metric data or the second metric data exceeding a latency threshold, a latency alert to a user computing device associated with the application. The monitoring process is not a process of the application and is not linked with the first process or the second process.

One problem relates to a wire-to-wire latency measurement that provides latency analytics of an application server without giving insight to code delays and application hot spots therein (see FIG. 1A). These conventional solutions only allow for collecting performance information as "wire-to-wire" data from the points where the data enters and exits the server. Moreover, conventional analytics systems support wire-to-wire latency, providing telemetry into trade flow for performance measurement, trade plant health and forensics, based on the wire-to-wire latency measurement only. Such analytics systems can capture and provide trade flow analytics based on latency measurement data. Another problem relates to an overhead incurred by capturing application metrics from the server/application, thereby slowing down the performance of the server/application. For example, conventionally, using a measurement API or library (C++, Java) to collect data from an application requires integration of the API or library into the application code, thereby making the solution slow to market. The integrated application code can gather intra-process latency metric data and display application internal processes using the metric data. However, the server and/or the application itself needs to be executed to collect the metric data, thereby incurring a significant amount of overhead to the server and/or the application.

To solve these problems, according to certain aspects, embodiments in the present disclosure relate to techniques for a wire-to-application-to-wire measurement, in which latency of a packet is measured not only as it enters or exits an application server, but also as an application code in the server performs its function and out through the network card. For example, in FIG. 1B, a wire-to-application-to-wire latency measurement can provide a latency of application code or NIC of an application server 100 between an ingress trading flow 110 and an egress trading flow 170. For example, the wire-to-application-to-wire latency measurement can provide latency $\Delta_{12}$ (182) of application code 130, latency $\Delta_{13}$ (183) of application code 140, latency $\Delta_{11}$ (181)

of NIC 120, and latency $\Delta_{14}$ (184) of NIC 150, in addition to the total latency of the server 100. This latency measurement technique can provide hop by hop analytics using an analytics systems for example, including the insight to the code functions delays and app hot spots.

According to certain aspects, embodiments in the present disclosure relate to techniques for allowing a measurement or monitoring system to capture performance information (e.g., latency metric data, timestamps) non-intrusively, i.e., independently from the operation of the application code in the server. This allows for the collection of "wire-to-application" (or wire-to-application-to-wire) data non-intrusively. As a result, insight on intra-process latencies can be gained without interrupting the flow of data within the server without adding any overhead to an ultra-low latency application stack. This technique allows for performance information to be collected from within the application using a distributed programming platform with a low-latency message framework, thereby accomplishing intra-process performance measurement non-intrusively. Here, the term "non-intrusive" means (1) without adding application code that would affect the latency profile of the application that is being monitored, or (2) executing an independent process which is not a process of the application nor is statically or dynamically linked with the application.

According to certain aspects, embodiments in the present disclosure relate to techniques for collecting and providing intra-process application latency metric data for low latency trading applications non-intrusively with a significantly low overhead. Collected intra-process application latency metric data may provide a network stack latency, an intra-process latency, a latency of garbage collection, a latency of process scheduling, and so forth, thereby gaining the visibility into the application hot spots. With such collected intra-process application latency metric data, a monitoring system according to some embodiments can offload the work of serializing, batching and publishing timestamped application events by giving a holistic picture of the event as it starts from the wire (network receiving the packets) to the application code processing, and as it puts it back on the wire (on a NIC). This can provide a full hop by hop view of latency referred to as "wire-to-application-to-wire" latency, thereby maintaining a latency profile of the application and its services (or processes).

A monitoring system according to some embodiments can be integrated with a SOA-based distributed programming platform or a microservices-based distributed programming platform that employs a low-latency message framework to design and deploy an event driven SOA or microservices application providing a low latency architecture. A monitoring system according to some embodiments, once integrated into the low-latency message framework, can provide intra-process latency for various services within a deployable object (for example, container, package, or Pod). In some embodiments, a monitoring system, once integrated into the low-latency message framework, can provide intra-process latency for various services within a single instance of a running process in a cluster (e.g., within an application Pod). In some embodiments, multiple application pods can run in a server. In addition to process latency (e.g., latency of each process of the application), the monitoring system can add an intra-process queue latency (e.g., latency of a queue between processes) and a wire-to wire latency to provide a complete hop by hop view of the application as the application completes its functions and passes through various stages chronologically.

A monitoring system according to some embodiments may collect application data (e.g., trade data or a trade request or a trade order) from a service queue (e.g., a queue implemented using a low-latency message framework). The application data may be appended with, or include, tags uniquely identifying the data as it is processed by an application code in an application server. The application data may be then sorted in an analytics system to give a chronological view of the "sequence of events" along with latency metrics as they occur in the application or in the deployable object (e.g., application Pod). The monitoring system may provide complete latency metrics of the application server by collecting "wire-to-application-to-wire" data which includes telemetry information collected as data is received at a network interface card (e.g., NIC), telemetry information collected as the data is processed by the application, and telemetry information collected as the data exits the network card from the server. The monitoring system can collect application data non-intrusively by (1) polling or periodically accessing for tagged data written to a service queue within the application, (2) then grabbing (or obtaining or accessing) the tagged data from the service queue, and (3) sending the tagged data grabbed from the service queue to an analytics system for analysis.

A monitoring system according to some embodiments can monitor an application or processes of the application non-intrusively. The monitoring system can non-intrusively collect and publish service data and queue data for use in performance monitoring related to hops within the application. In one example, the monitoring system may obtain data for use in determining latency between an output queue of a first process (e.g., a process of client receiver) and an input queue of a second process (e.g., a process of core service) by polling or periodically accessing for tagged data written to a first service queue within the application, and then grabbing (or obtaining or accessing) the tagged data from the first service queue when the polling results in tagged data being present within the first service queue. In an additional example, the monitoring system may obtain data for use in determining a latency between an input queue of the second process (e.g., the process of the core service) and an output queue of the second process by polling (or periodically accessing) for tagged data written to a second service queue within the application and then grabbing (or obtaining or accessing) the tagged data from the second service queue when the polling results in tagged data being present within the second service queue.

According to certain aspects, a system for monitoring latency of an application while one or more processes of the application are executed to process application data (e.g., trade data, a trade request, or an order request) that is input to the application, may include a memory including non-transitory machine-readable storage, and one or more processors. The one or more processors may be configured to measure, by executing a monitoring process, first metric data associated with first application data (e.g., trade data, a trade request, or an order request) at a first time point after the first application data is output by a first process of the application and before the first application data is input to a second process of the application. The one or more processors may be configured to identify, by executing the monitoring process, the first application data at a second time point after the first application data is output by the second process of the application and before the first application data is output by the application. The one or more processors may be configured to in response to identifying the first application data at the second time point, measure, by executing the monitoring process, second metric data associated with the first application data identified at the second time point. The one or more processors may be configured to send, in response to a latency value obtained based on the first metric data or the second metric data exceeding a latency threshold, a latency alert to a user computing device (e.g., user or an administrator) associated with the application. The monitoring process is not a process of the application and is not linked with the first process or the second process.

The one or more processors may be configured to obtain one or more latency values based on the first metric data and/or the second metric data. The one or more processors may be configured to compare the one or more latency values with a baseline latency profile of the application. The one or more processors may be configured to send, based on a result of the comparing, the latency alert to the user computing device of the application.

In measuring the first metric data, the one or more processors may be configured to periodically access a first queue into which output data of the first process of the application are inserted and from which input data of the second process of the application are removed. The one or more processors may be configured to determine, as a result of periodically accessing the first queue, that the first application data is inserted in the first queue, and obtain the first metric data associated with first application data at the first time point. The one or more processors may be further configured to determine, as a result of periodically accessing the first queue, that the first application data is removed from the first queue, and obtaining third metric data associated with first application data at a third time point which is between the first time point and the second time point.

The first application data may include a first tag. In identifying the first application data at the second time point, the one or more processors may be configured to periodically access a second queue into which output data of the second process of the application are inserted. The one or more processors may be configured to determine, as a result of periodically accessing the second queue, that the first application including the first tag is inserted in the second queue. The one or more processors may be further configured to determine, as a result of periodically accessing the second queue, that the first application data including the first tag is removed from the second queue, and obtaining fourth metric data associated with first application data at a fourth time point which is later than the second time point.

Embodiments in the present disclosure can have the following advantages. First, some embodiments can provide useful techniques for allowing an agent to capture the performance information non-intrusively, e.g., independently from the operation of the application code. This allows for the collection of "wire-to-application-to-wire" data non-intrusively, thereby gaining insight on intra-process latencies without interrupting the flow of data within the server and/or without adding any overhead to an application stack having a significantly low latency.

Second, some embodiments can provide useful techniques for allowing for performance information to be collected from a service queue (e.g., a service queue implemented using a low-latency message framework) within the application in a manner that is accomplished non-intrusively, i.e., without adding extra measurement code to the application code, or without statically or dynamically linking to the application code, or by executing an independent process from the application. For example, addition of extra measurement code to the application code would affect the latency profile of the application that is being monitored.

Figure 5:
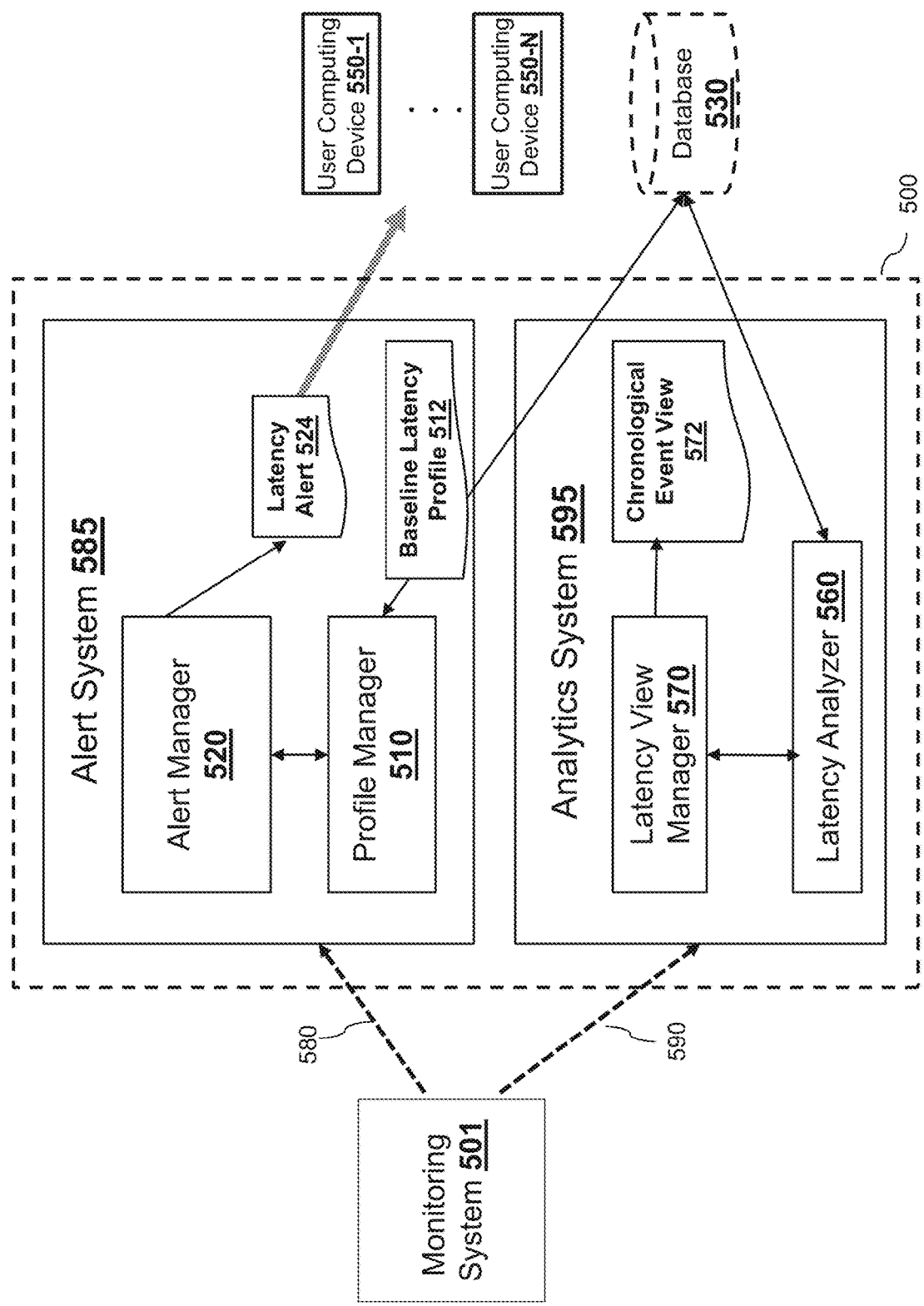
FIG. 5 is a block diagram showing an alert system and an analytics system, according to some embodiments.

Third, some embodiments can provide useful techniques for allowing a user or administrator of an application server or applications running thereon to promptly receive a latency alert that identifies a latency bottleneck (or a latency hotspot or an outlier) in the application server or the applications (see FIG. 5). With a latency alert, the administrator can fix the problem in a timely manner, and the user can avoid the latency bottleneck by changing the usage of the applications.

Fourth, some embodiments can provide useful techniques for improving the performance of an application server or application running thereon. For example, precise latency measurements according to some embodiments can be used to display a chronological event/latency view (see FIG. 6) so that a support team (or an administrator of an application server) can watch a dashboard showing the chronological event/latency view for troubleshooting and forensics purpose also. Precise latency measurements can help the support team or administrator to manage latency profiles of their applications and maintain the profiles in a database, for example, so that developers can improve their application performance in quality assurance using the profiles.

Figure 3:
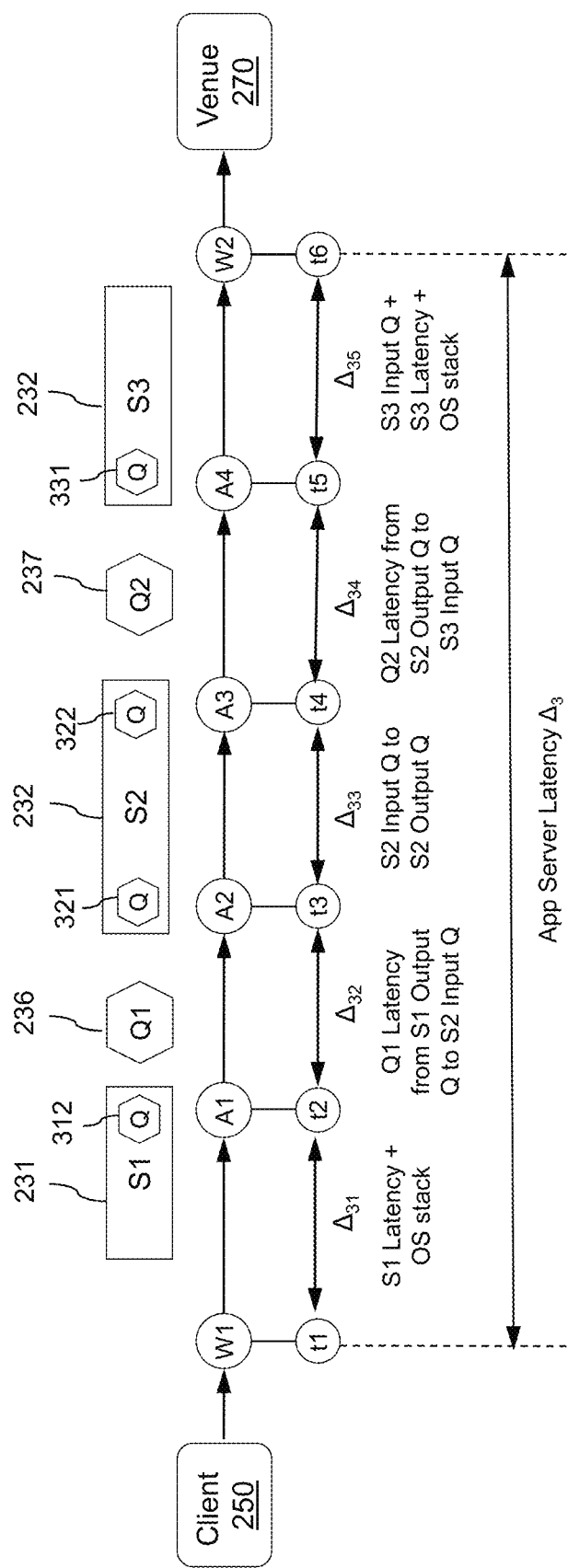
FIG. 3 is a block diagram showing intra-process latencies of an application obtained by the monitoring system of FIG. 2, according to some embodiments.

FIG. 2 is a block diagram showing operations of a monitoring system 200 for obtaining intra-process latencies of an application 230, according to some embodiments. FIG. 3 is a block diagram showing intra-process latencies of the application obtained by the monitoring system 200 of FIG. 2, according to some embodiments.

The monitoring system 200 may monitor intra-process latencies of the application 230 while an application server 205 executes one or more processes of the application 230 including a process 231 of service S1, a process 232 of service S2, or a process 233 of service S3. In some embodiments, the application 230 is a trading application, for example, a market data feed handler, a trading algorithms/orders router, or a market access server. The services S1, S2 and S3 may be a client receiver, a core service, and a venue transmitter, respectively.

Figure 4:
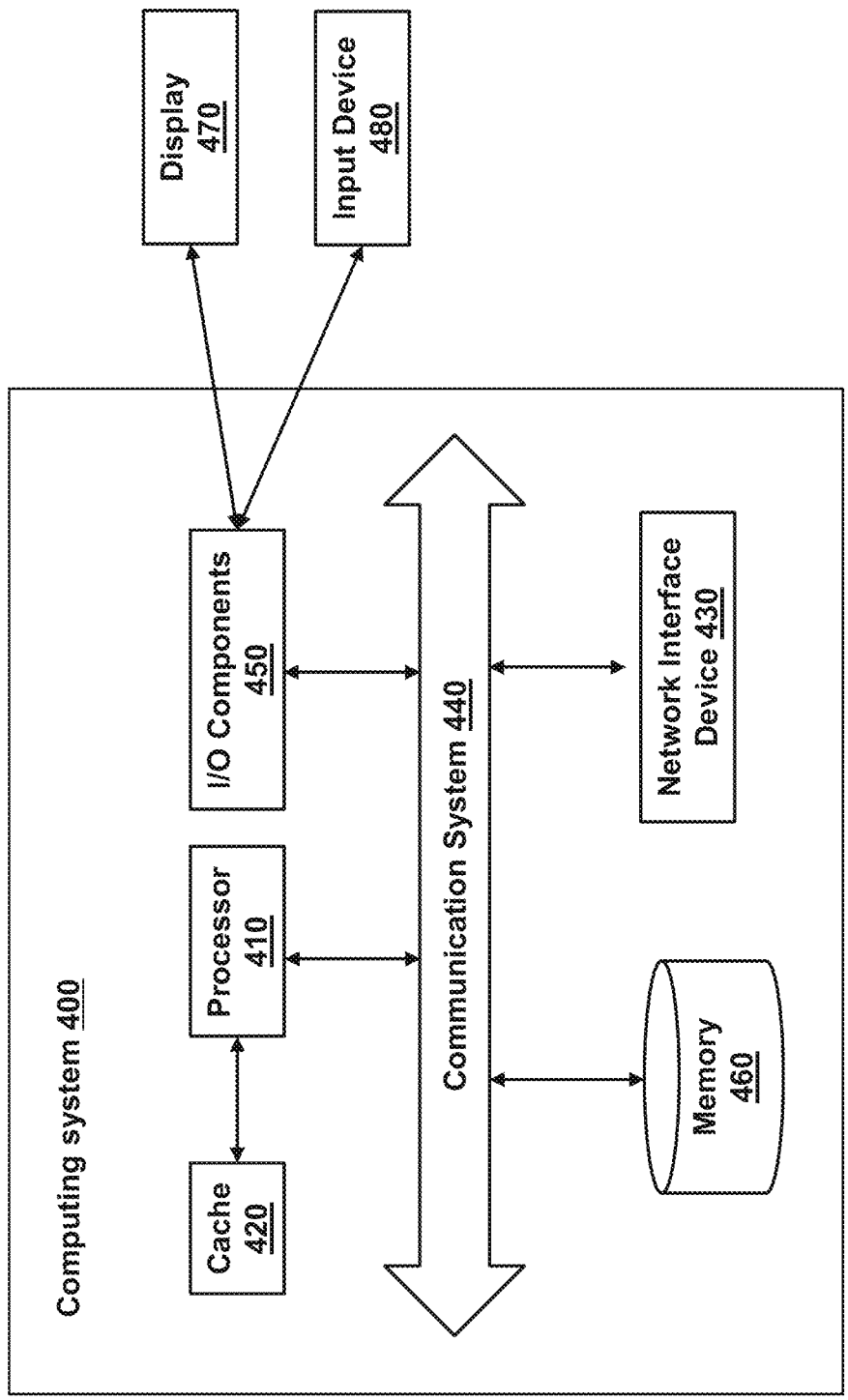
FIG. 4 is a block diagram showing an example of a computing system, according to some embodiments.

The monitoring system 200 and the server 205 may be implemented in the same computing device having similar configuration to the configurations of a computing system 400 in FIG. 4. In some embodiments, each of the monitoring system 200 and the server 205 may be implemented in a computing device having similar configuration to the configurations of a computing system 400 in FIG. 4. The monitoring system 200 may be executed as a service or a process, independent from the application 230. The monitoring system 200 may not be a process of the application 230 nor be statically or dynamically linked with the application 230 or processes thereof.

Referring to FIGS. 2 and 3, when trade data (e.g., order or request for trading a stock) transmitted from a client 260 (e.g., algorithmic trading client) via a tap 265 (e.g., network tap for monitoring network events) arrives at a client-facing NIC 210, wire event W1 may occur and data 212 may be collected at the NIC 210 and provided to an analytics system 290 and/or the monitoring system 200. The collected data 212 may include (1) application ID (e.g., ID "AppX" of the application 230), (2) client order ID (COID) (e.g., "1234") and (3) timestamp measured at event W1 (e.g., t1 (ms or ns)). The data 212 may not be a human readable format and the monitoring system 200 (e.g., latency manager 224) may convert or translate the data in more readable format for the alert system 280 or the analytics system 290. As the data is input to the application 230 (now the data is referred to as "application data") and then is stored in an output queue of the process 231 (e.g., output queue 312), application event (or virtual hop) A1 may occur and application data 241 may be collected by the monitoring system 200 polling a service queue 236 for the data present or inserted in the service queue. In some embodiments, a service queue may be used like a memory space. Services or processes (e.g., processes 231-233) may read from a service queue. As one service or process completes its processing of data in the service queue, a next service can take information of the queue and process the data in the service queue.

The collected application data 241 may include the same client order ID as that of the data 212 (e.g., "1234") as a tag for identifying the same data as the data 212. The tagged application data 241 may also include (1) application ID (e.g., ID "AppX" of the application 230), (2) event type (e.g., "S1 output") and (3) timestamp measured at event A1 (e.g., t2 (ms or ns)). As the application data is stored in an input queue of the process 232 (e.g., input queue 321), application event (or virtual hop) A2 may occur and application data 242 may be collected by the monitoring system 200 polling the service queue 236 for the data removed from the service queue. The collected application data 242 may be tagged with the same tag (e.g., "1234") and include the same information as the data 241 except including the event type of "S2 input" and timestamp of t3. Similarly to the above-noted collection at application events A1 and A2, application data may be collected at application events (or virtual hops) A3 and A4. That is, as the data is input to the process 232 and then is stored in an output queue of the process 232 (e.g., output queue 322), application event A3 may occur and application data 243 may be collected by the monitoring system 200 polling an service queue 237 for the data present or inserted in the service queue. The collected application data 243 may be tagged with the same tag (e.g., "1234") and include the same information as the data 242 except including the event type of "S2 output" and timestamp of t4. As the application data is stored in an input queue of the process 233 (e.g., input queue 331), application event A4 may occur and application data 244 may be collected by the monitoring system 200 polling the service queue 237 for the data removed from the service queue. The collected application data 244 may be tagged with the same tag (e.g., "1234") and include the same information as the data 243 except including the event type of "S3 input" and timestamp of t5. When application data exits process 233 and the application 230 and arrives at a venue-facing NIC 250, wire event W2 may occur and data 252 may be collected at the NIC 250 and then provided to an analytics system 290 and/or the monitoring system 200. The collected data 252 may include (1) application ID (e.g., ID "AppX" of the application 230), (2) client order ID (COID) (e.g., "1234") and (3) timestamp measured at event W2 (e.g., t6 (ms or ns)). The data exiting the NIC 250 may be transmitted via a tap 275 to the next destination, for example, a trading venue 270. Latency information collected by the monitoring system 200 may be transmitted via the tap 275 to at least one of an alert system 280 or the analytics system 290. For example, the latency information may include (1) application data type (e.g., new order), (2) events and corresponding measured timestamps, or (3) intra-process latencies calculated based on the timestamps.

The monitoring system 200 may include a service manager 222 and a latency manager 224. The service manager 222 may be a software module, which may be executed by the server 205 or the monitoring system 200. The service manager 222 may be configured to implement monitoring or measurement modules by invoking functions of an SOA-based platform or a microservices-based platform with a low-latency message framework. For example, the service manager 222 may implement polling for data stored in a service queue (e.g., service queues 236 and 237 which are implemented using a low-latency message framework).

The latency manager 224 may be a software module, which may be executed by the server 205 or the monitoring system 200. The latency manager 224 may be configured to implement and execute monitoring or measurement modules that are not necessarily implemented using functions of an SOA-based platform or a microservices-based platform with a low-latency message framework. For example, referring to FIGS. 2 and 3, the latency manager 224 may implement and execute a measuring module configured to measure timestamps $t_2$, $t_3$, $t_4$, $t_5$ at application events such as A1 (when application data is removed from an output queue 312 of the process 231), A2 (when application data is inserted into an input queue 321 of the process 232), A3 (when application data is removed from an output queue 322 of the process 232) and A4 (when application data is inserted into an input queue 331 of the process 233), respectively. Combining with timestamps $t_1$ and $t_6$ measured at wire events such as W1 (when trade data arrives at a client-facing NIC 210) and W2 (when trade data departs at a venue-facing NIC 250), the latency manager 224 may calculate latencies between those events in addition to the total latency of the server 43 (see FIG. 3). For example, the latency manager 224 calculates a latency $\Delta_{31}$ (between wire event W1 and application event A1; this latency may include a latency of an operating system stack), a latency $\Delta_{32}$ (between application event A1 and application event A2; this latency indicates a latency of the service queue 236), a latency $\Delta_{33}$ (between application event A2 and application event A3), a latency $\Delta_{34}$ (between application event A3 and application event A4; this latency indicates a latency of the service queue 237), and a latency $\Delta_{35}$ (between application event A4 and wire event W2; this latency may include a latency of an operating system stack).

Referring to FIGS. 2 and 3, the monitoring system 200 may collect application data (e.g., collected application data 241-244) from a service queue 236 or 237. The application data may be appended with, or include, tags uniquely identifying the data (e.g., tagged with client order ID "1234") as it may be processed by an application code in an application server. The application data may be then sorted in the analytics system 290 to give a chronological view of the "sequence of events" (for example, dashboard of chronological event view 672 in FIG. 6) along with latency metrics as they occur in the application or in the deployable object (e.g., application Pod). The monitoring system 200 may provide complete latency metrics of the application server (e.g., total latency $\Delta_3$ as well as intra-process latencies $\Delta_{31}$, $\Delta_{32}$, $\Delta_{33}$, $\Delta_{34}$, and $\Delta_{35}$) by collecting "wire-to-application-to-wire" data which includes telemetry information (e.g., data 212) collected as data is received at a network card (e.g., NIC 210), telemetry information (e.g., application data 241-244) collected as the data is processed by the application 230, and/or telemetry information (e.g., data 252) collected as the data exits a network card (e.g., NIC 250) from the server 205. The monitoring system 200 can collect application data non-intrusively by (1) polling or periodically accessing for tagged data written to a service queue (e.g., a service queue implemented using a low-latency message framework) within the application, (2) then grabbing (or obtaining or accessing) the tagged data (e.g., tagged data 241-244) from the service queue, and (3) sending the tagged data grabbed from the service queue to an analytics system 290 for analysis or an alert system 280 for sending a latency alert to a user computing device (e.g., a user or an administrator) associated with the application.

The monitoring system 200 can non-intrusively monitor an application (e.g., application 230) or processes of the application (e.g., processes 231, 232, 233). The monitoring system can non-intrusively collect and publish service data and queue data (e.g., application data 241-244) for use in performance monitoring related to events or hops within the application (e.g., application events A1-A4). In one example, the monitoring system may obtain data for use in determining a latency $\Delta_{32}$ between an output queue 312 of the process 231 and an input queue 321 of the process 232 by polling or periodically accessing for tagged data written to a first service queue (e.g., service queue 236) within the application, and then grabbing (or obtaining or accessing) the tagged data from the first service queue when the polling results in tagged data being present within the first service queue. In an additional example, the monitoring system may obtain data for use in determining a latency between an input queue (e.g., input queue 321) of the second process (e.g., the process 232) and an output queue (e.g., output queue 322) of the second process by polling (or periodically accessing) for tagged data written to a second service queue (e.g., service queue 237) within the application and then grabbing (or obtaining or accessing) the tagged data (e.g., data 243) from the second service queue when the polling results in tagged data being present within the second service queue.

FIG. 4 is a block diagram showing an example of a computing system, according to some embodiments. An illustrated example computing system 400 includes one or more processors 410 in communication, via a communication system 440 (e.g., bus), with memory 460, at least one network interface controller 430 with network interface port for connection to a network (not shown), and other components, e.g., input/output ("I/O") components 450. Generally, the processor(s) 410 will execute instructions (or computer programs) received from memory. The processor(s) 410 illustrated incorporate, or are directly connected to, cache memory 420. In some instances, instructions are read from memory 460 into cache memory 420 and executed by the processor(s) 410 from cache memory 420.

In more detail, the processor(s) 410 may be any logic circuitry that processes instructions, e.g., instructions fetched from the memory 460 or cache 420. In many implementations, the processor(s) 410 are microprocessor units or special purpose processors. The computing device 400 may be based on any processor, or set of processors, capable of operating as described herein. The processor(s) 410 may be single core or multi-core processor(s). The processor(s) 410 may be multiple distinct processors.

The memory 460 may be any device suitable for storing computer readable data. The memory 460 may be a device with fixed storage or a device for reading removable storage media. Examples include all forms of non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, or Blu-Ray® discs). A computing system 400 may have any number of memory devices 460.

The cache memory 420 is generally a form of computer memory placed in close proximity to the processor(s) 410 for fast read times. In some implementations, the cache memory 420 is part of, or on the same chip as, the processor (s) 410. In some implementations, there are multiple levels of cache 420, e.g., L2 and L3 cache layers.

The network interface controller 430 manages data exchanges via the network interface (sometimes referred to as network interface ports). The network interface controller 430 handles the physical and data link layers of the OSI model for network communication. In some implementations, some of the network interface controller's tasks are handled by one or more of the processor(s) 410. In some implementations, the network interface controller 430 is part of a processor 410. In some implementations, the computing system 400 has multiple network interfaces controlled by a single controller 430. In some implementations, the computing system 400 has multiple network interface controllers 430. In some implementations, each network interface is a connection point for a physical network link (e.g., a cat-5 Ethernet link). In some implementations, the network interface controller 430 supports wireless network connections and an interface port is a wireless (e.g., radio) receiver/transmitter (e.g., for any of the IEEE 802.11 protocols, near field communication "NFC", Bluetooth, ANT, or any other wireless protocol). In some implementations, the network interface controller 430 implements one or more network protocols such as Ethernet. Generally, a computing device 400 exchanges data with other computing devices via physical or wireless links through a network interface. The network interface may link directly to another device or to another device via an intermediary device, e.g., a network device such as a hub, a bridge, a switch, or a router, connecting the computing device 400 to a data network such as the Internet.

The computing system 400 may include, or provide interfaces for, one or more input or output ("I/O") devices. Input devices include, without limitation, keyboards, microphones, touch screens, foot pedals, sensors, MIDI devices, and pointing devices such as a mouse or trackball. Output devices include, without limitation, video displays, speakers, refreshable Braille terminal, lights, MIDI devices, and 2-D or 3-D printers.

Other components may include an I/O interface, external serial device ports, and any additional co-processors. For example, a computing system 400 may include an interface (e.g., a universal serial bus (USB) interface) for connecting input devices, output devices, or additional memory devices (e.g., portable flash drive or external media drive). In some implementations, a computing device 400 includes an additional device such as a co-processor, e.g., a math co-processor can assist the processor 410 with high precision or complex calculations.

The components 450 may be configured to connect with external media, a display 470, an input device 480 or any other components in the computing system 400, or combinations thereof. The display 470 may be a liquid crystal display (LCD), an organic light emitting diode (OLED), a flat panel display, a solid state display, a cathode ray tube (CRT), a projector, a printer or other now known or later developed display device for outputting determined information. The display 470 may act as an interface for the user to see the functioning of the processor(s) 410, or specifically as an interface with the software stored in the memory 460.

The input device 480 may be configured to allow a user to interact with any of the components of the computing system 400. The input device 480 may be a plurality pad, a keyboard, a cursor control device, such as a mouse, or a joystick. Also, the input device 480 may be a remote control, touchscreen display (which may be a combination of the display 470 and the input device 480), or any other device operative to interact with the computing system 400, such as any device operative to act as an interface between a user and the computing system 400.

FIG. 5 is a block diagram showing an alert system 585 and an analytics system 595, according to some embodiments.

FIG. 6 is a diagram showing an example chronological event view obtained by the analytics system of FIG. 5, according to some embodiments.

As described in the previous section, latency information 580, 590 collected by a monitoring system 501 may be transmitted to at least one of an alert system 585 or the analytics system 595. The monitoring system 501 has configuration similar to that of the monitoring system 200 in FIG. 2. The latency information 580, 590 may include (1) application data type (e.g., new order), (2) events and corresponding measured timestamps, or (3) intra-process latencies calculated based on the timestamps. In some embodiments, each of the alert system 585 and the analytics system 595 may be implemented in a computing system having similar configuration as that of the computing system 400. In some embodiments, the alert system 585 and the analytics system 595 may be implemented in the same computing system (e.g., computing system 500 in FIG. 5) having similar configuration as that of the computing system 400.

The alert system 585 may include a profile manager 510 and an alert manager 520. The profile manager 510 may be a software module, which may be executed by the alert system 585. The profile manager 510 may be configured to generate a baseline latency profile 512 of an application (e.g., application 230 in FIG. 2) based on latency information of the application received from the monitoring system 501 or based on accumulated data of previous latency information of the application. The baseline latency profile of an application may include a normal range of a total latency which is similar to $\Delta_3$ in FIG. 3 and/or a normal range of each of intra-process latencies (between events) which are similar to $\Delta_{31}$-$\Delta_{35}$ in FIG. 3, so that an application or a process having a latency value beyond an upper value of the normal range can be determined as a latency bottleneck or a latency hotspot or an outlier. The normal range of latency between events may be determined based on the mean ($\mu$) and standard deviation ($\sigma$) of accumulated data of previous measured latency values. For example, the normal range of latency between events may be determined using a normal distribution of latency values (e.g., a range within $\mu\pm\sigma$, a range within $\mu\pm2\sigma$, or a range within $\mu\pm3\sigma$). The profile manager 510 may be configured to generate, based on latency information of the application received from the monitoring system 501 or based on accumulated data of previous latency information of the application, a latency threshold of a total latency and/or a latency threshold of each of intra-process latencies so that an application or a process having a latency value exceeding (or greater than) the latency threshold can be determined as a latency bottleneck or a latency hotspot or an outlier. In some embodiments, the latency thresholds may correspond to upper values of normal ranges of latency. In some embodiments, the profile manager 510 may store the baseline latency profile 512 and/or a set of latency thresholds in a database 530 and search and retrieve a latency profile and/or latency thresholds of a particular application from the database 530. In some embodiments, the database 530 may store latency profiles and/or latency thresholds of servers or services or processes in addition to latency profiles and/or latency thresholds of applications.

The alert manager 520 may be a software module, which may be executed by the alert system 585. In response to receiving the latency information 580 of the application 230, the alert manager 520 may cause the profile manager 510 to retrieve the baseline latency profile of the application 230 and compare the received latency information with the profile. For example, for each event duration (e.g., between W1 and A1, between A1 and A2, etc.) a latency value (e.g., $\Delta_{35}$) between events (e.g., between A4 and A5) in the received latency information may be compared with an upper value of the normal range of latency between those events (e.g., between A4 and A5) in the baseline latency profile retrieved from the database. In response to any latency value in the received latency information exceeding the upper value of the corresponding normal range in the baseline latency profile, the alert manager 520 may determine that the received latency information contains an abnormal latency (e.g., either abnormal total latency of the application 230 or abnormal intra-process latency thereof). Similarly, for each event duration (e.g., between W1 and A1, between A1 and A2, etc.) a latency value (e.g., $\Delta_{35}$) between events (e.g., between A4 and A5) in the received information may be compared with a latency threshold between those events (e.g., between A4 and A5) retrieved from the database. In response to any latency value in the received latency information exceeding the corresponding latency threshold, the alert manager 520 may determine that the received latency information contains an abnormal latency (e.g., either abnormal total latency of the application 230 or abnormal intra-process latency thereof). In response to determining that the received latency information contain any abnormal latency, the alert manager 520 may generate a latency alert 524 for one or more user computing devices 550-1 to 550-N (e.g., users or administrators) associated with the server 205 or the application 230 (e.g., client 250 in FIGS. 2 and 3), and send the latency alert to the one or more user computing devices. In some embodiments, the latency alert 524 may contain detailed intra-process latencies of the application (e.g., latency view similar to FIG. 3 or FIG. 6). In some embodiments, the latency alert 524 may contain a message indicating that a particular application (e.g., the application "AppX") is currently experiencing latency issues.

The analytics system 595 may include a latency analyzer 560 and a latency view manager 570. The latency analyzer 560 may be a software module, which may be executed by the analytics system 595. In response to receiving the latency information 590 of the application 230, the latency analyzer 560 may determine, based on the latency profile of the application 230, whether the received latency information contain any abnormal latency, in a manner similar to that of the alert manager 520 as described above.

The latency view manager 570 may be a software module, which may be executed by the analytics system 595. In response to receiving the latency information 590 of the application 230, the latency view manager 570 may generate a chronological event view 572 based on the received latency information 590.

FIG. 6 shows a dashboard (e.g., to be presented on display 470) having an example chronological event view 672 showing (1) application data or message type 620 (e.g., new order), (2) timestamps 610 (e.g., $t_1$ and $t_6$), (3) intra-process latencies 630 calculated based on the timestamps (e.g., $\Delta_{31}$-$\Delta_{30}$, and/or (4) a total latency 640 of the application. In some embodiments, the chronological event view may show or render a shape corresponding to each the latency (e.g., shapes 651-655 corresponding to $\Delta_{31}$-$\Delta_{35}$) such that an area or length of the shape can be proportional to an amount of the latency. In some embodiments, if the latency analyzer 560 determines that the received latency information contain an abnormal latency, the latency view manager 570 may use a particular color (e.g., red) for the corresponding shape to indicate the abnormal latency. The latency view manager

570 may display the chronological event view in a display (e.g., display 470 in FIG. 4). In some embodiments, the latency view manager 570 may store the chronological event view in a file (e.g., excel file or CSV file) or in a database (e.g., database 530).

Figure 7:
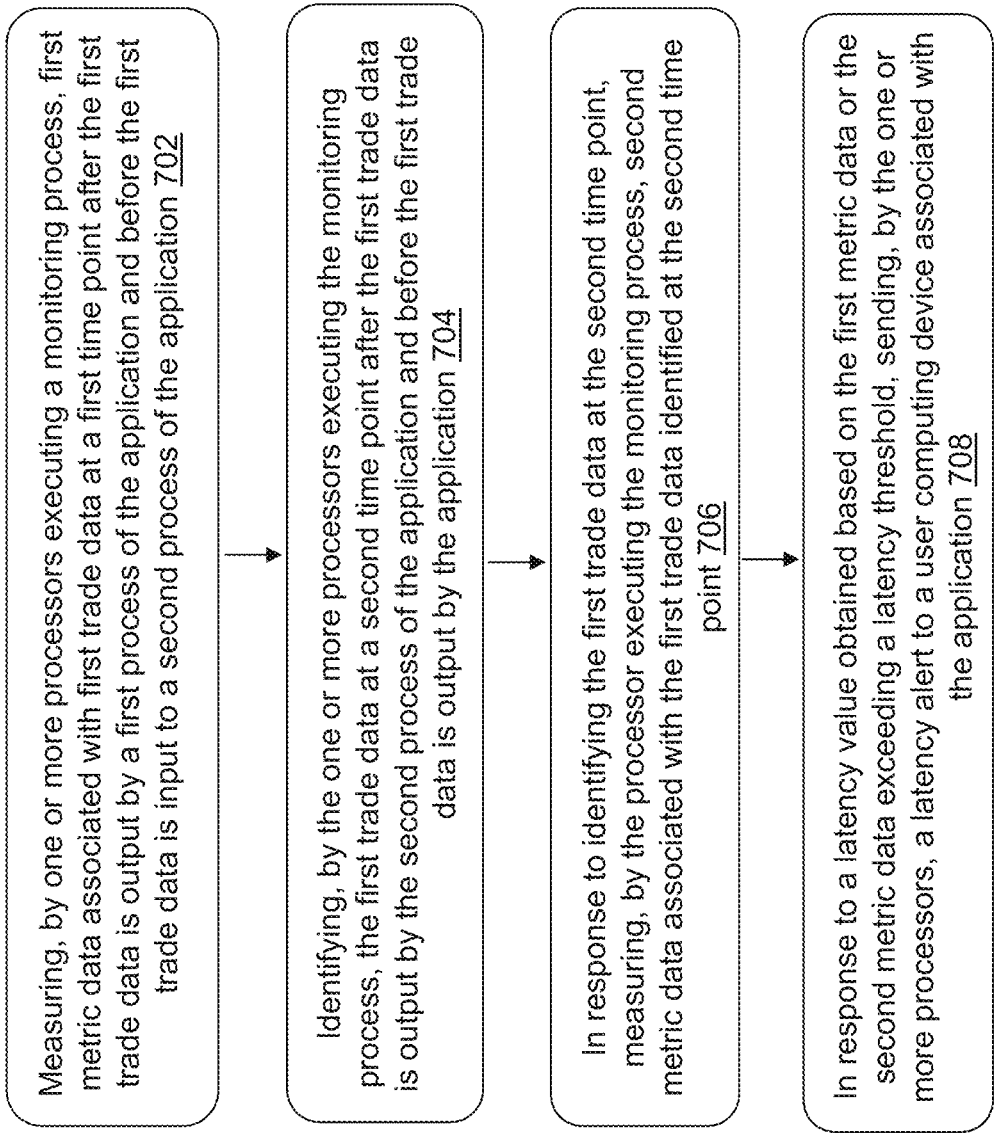
FIG. 7 is a flowchart illustrating a methodology for monitoring latency of an application, according to some embodiments.

FIG. 7 shows execution steps for monitoring latency of an application (e.g., application 230 in FIG. 2) while one or more processes of the application (e.g., processes 231-233 in FIG. 2) are executed to process application data (e.g., application data 212 in FIG. 2; trade data or a trade request or a trade order) that is input to the application, according to a method 700. The method 700 may include execution steps 702, 704, 706, and 708 performed in a monitoring system (e.g., monitoring system 200 in FIG. 2) including one or more processors (e.g., processor 410 in FIG. 4). It should be understood that the steps described herein are merely illustrative and additional or substitute steps should also be considered to be within the scope of this disclosure. Furthermore, methods with a fewer numbers of steps should also be considered to be within the scope of this disclosure.

At step 702, the one or more processors of the monitoring system may measure, by executing a monitoring process (e.g., the monitoring system 200 may be executed as a service or a process), first metric data (e.g., timestamp $t_2$ in FIG. 2) associated with first application data (e.g., application data 241-244 in FIG. 2; trade data or a trade request or a trade order) at a first time point (e.g., event A1 in FIG. 2) after the first application data is output by a first process of the application (e.g., process 231 in FIG. 2) and before the first application data is input to a second process of the application (e.g., process 232 in FIG. 2). The monitoring process is not a process of the application and is not linked with the first process or the second process (e.g., the process of the monitoring system 200 is independently executed from the application 230 or processes thereof).

In measuring the first metric data, the one or more processors of the monitoring system may periodically access a first queue (e.g., polling the service queue 236 in FIG. 2) into which output data of the first process of the application are inserted and from which input data of the second process of the application are removed. The one or more processors of the monitoring system may determine, as a result of periodically accessing the first queue, that the first application data is inserted in the first queue, and obtained the first metric data associated with first application data at the first time point (e.g., application event A1 in FIG. 2).

At step 704, the one or more processors of the monitoring system may identify, by the one or more processors executing the monitoring process, the first application data at a second time point (e.g., identifying the application data 243 with the tag "1234" included therein at application event A3 in FIG. 2) after the first application data is output by the second process of the application and before the first application data is output by the application. The one or more processors of the monitoring system may determine, as a result of periodically accessing the first queue, that the first application data is removed from the first queue (e.g., service queue 236 in FIG. 2), and obtain third metric data (e.g., timestamp $t_3$ in FIG. 2) associated with first application data at a third time point (e.g., application event A2 in FIG. 2) which is between the first time point and the second time point.

At step 706, in response to identifying the first application data at the second time point (e.g., application event A3 in FIG. 2), the one or more processors of the monitoring system may measure, by executing the monitoring process, second metric data (e.g., timestamp $t_4$ in FIG. 2) associated with the first application data identified at the second time point (e.g., application data 243 in FIG. 2).

The first application data may include a first tag (e.g., "1234" in FIG. 2). In identifying the first application data at the second time point (e.g., application event A3), the one or more processors of the monitoring system may periodically access a second queue (e.g., service queue 237 in FIG. 2) into which output data of the second process of the application are inserted. The one or more processors of the monitoring system may determine, as a result of periodically accessing the second queue, that the first application including the first tag is inserted in the second queue. The one or more processors of the monitoring system may determine, as a result of periodically accessing the second queue, that the first application data including the first tag is removed from the second queue, and obtain fourth metric data (e.g., timestamp $t_5$ in FIG. 2) associated with first application data at a fourth time point (e.g., application event A4) which is later than the second time point (e.g., application event A3).

At step 708, in response to a latency value (e.g., $\Delta_{35}$ in FIG. 3) obtained based on the first metric data or the second metric data (e.g., timestamp $t_2$ or $t_4$ in FIG. 2) exceeding a latency threshold, a latency alert (e.g., latency alert 524 in FIG. 5) may be sent to a user computing device (e.g., user devices 550-1 to 550-N in FIG. 5) associated with the application. In some embodiments, one or more latency values (e.g., $\Delta_{35}$ in FIG. 3) may be obtained based on the first metric data and the second metric data. The one or more latency values may be compared with a baseline latency profile of the application (e.g., baseline latency profile 512 retrieved from the database 530 in FIG. 5). Based on a result of the comparing, the latency alert may be sent to the user computing device associated with the application.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may include RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method of monitoring latency of an application while one or more processes of the application are executed in a computing device to process trade data that is input to the application, the method comprising:
    measuring, by one or more processors of a computing device executing a monitoring process, first metric data associated with first trade data at a first time point after the first trade data is output by the one or more processors of the computing device executing a first process of the application and before the first trade data is input to a second process of the application;
    identifying, by the one or more processors of the computing device executing the monitoring process, the first trade data at a second time point after the first trade data is output by the one or more processors of the computing device executing the second process of the application and before the first trade data is output by the one or more processors of the computing device executing the application;
    in response to identifying the first trade data at the second time point, measuring, by the one or more processors of the computing device executing the monitoring process, second metric data associated with the first trade data identified at the second time point; and
    in response to a latency value obtained based on the first metric data or the second metric data exceeding a latency threshold, sending, by the one or more processors of the computing device, a latency alert to a user computing device associated with the application,
    wherein the monitoring process is not a process of the application and is not linked with the first process or the second process, and
    wherein the latency value obtained based on the first metric data or the second metric data indicates a latency of a queue between the first process executed by the one or more processors of the computing device and the second process executed by the one or more processors of the computing device.

2. The method according to claim 1, further comprising:
    obtaining, by the one or more processors, one or more latency values based on the first metric data and the second metric data;
    comparing, by the one or more processors, the one or more latency values with a baseline latency profile of the application; and
    sending, by the one or more processors, based on a result of the comparing, a latency alert to the user computing device associated with the application.

3. The method according to claim 1, wherein measuring the first metric data includes:
    periodically accessing a first queue into which output data of the first process of the application are inserted and from which input data of the second process of the application are removed; and
    determining, as a result of periodically accessing the first queue, that the first trade data is inserted in the first queue, and obtaining the first metric data associated with first trade data at the first time point.

4. The method according to claim 3, further comprising:
    determining, as a result of periodically accessing the first queue, that the first trade data is removed from the first queue, and obtaining third metric data associated with first trade data at a third time point which is between the first time point and the second time point.

5. The method according to claim 1, wherein the first trade data includes a first tag.

6. The method according to claim 5, wherein identifying the first trade data at the second time point includes:
periodically accessing a second queue into which output data of the second process of the application are inserted; and
determining, as a result of periodically accessing the second queue, that the first application including the first tag is inserted in the second queue.

7. The method according to claim 6, further comprising:
determining, as a result of periodically accessing the second queue, that the first trade data including the first tag is removed from the second queue, and obtaining fourth metric data associated with first trade data at a fourth time point which is later than the second time point.

8. A system for monitoring latency of an application while one or more processes of the application are executed in the system to process trade data that is input to the application, the system comprising:
a memory comprising non-transitory machine-readable storage; and
one or more processors configured to:
measure, by executing a monitoring process, first metric data associated with first trade data at a first time point after the first trade data is output by he one or more processors of the system executing a first process of the application and before the first trade data is input to a second process of the application;
identify, by executing the monitoring process, the first trade data at a second time point after the first trade data is output by the one or more processors of the system executing the second process of the application and before the first trade data is output by the one or more processors of the system executing the application;
in response to identifying the first trade data at the second time point, measure, by executing the monitoring process, second metric data associated with the first trade data identified at the second time point; and
in response to a latency value obtained based on the first time metric data or the second time metric data exceeding a latency threshold, send a latency alert to a user computing device associated with the application,
wherein the monitoring process is not a process of the application and is not linked with the first process or the second process, and
wherein the latency value obtained based on the first metric data or the second metric data indicates a latency of a queue between the first process executed by the one or more processors of the system and the second process executed by the one or more processors of the system.

9. The system according to claim 8, wherein the one or more processors are further configured to:
obtain one or more latency values based on the first metric data and the second metric data;
compare the one or more latency values with a baseline latency profile of the application; and
send, based on a result of the comparing, a latency alert to the user computing device associated with the application.

10. The system according to claim 8, wherein in measuring the first metric data, the one or more processors are configured to:
periodically access a first queue into which output data of the first process of the application are inserted and from which input data of the second process of the application are removed; and
determine, as a result of periodically accessing the first queue, that the first trade data is inserted in the first queue, and obtain the first metric data associated with first trade data at the first time point.

11. The system according to claim 10, wherein the one or more processors are further configured to:
determine, as a result of periodically accessing the first queue, that the first trade data is removed from the first queue, and obtaining third metric data associated with first trade data at a third time point which is between the first time point and the second time point.

12. The system according to claim 8, wherein the first trade data includes a first tag.

13. The system according to claim 12, wherein in identifying the first trade data at the second time point, the one or more processors are configured to:
periodically access a second queue into which output data of the second process of the application are inserted; and
determine, as a result of periodically accessing the second queue, that the first application including the first tag is inserted in the second queue.

14. The system according to claim 13, wherein the one or more processors are further configured to:
determine, as a result of periodically accessing the second queue, that the first trade data including the first tag is removed from the second queue, and obtaining fourth metric data associated with first trade data at a fourth time point which is later than the second time point.

15. A non-transitory computer readable medium storing program instructions configured to be executed by one or more processors of a computing device to:
measure, by executing a monitoring process, first metric data associated with first trade data at a first time point after the first trade data is output by the one or more processors of the computing device executing a first process of the application and before the first trade data is input to a second process of the application;
identify, by executing the monitoring process, the first trade data at a second time point after the first trade data is output by the one or more processors of the computing device executing the second process of the application and before the first trade data is output by the one or more processors of the computing device executing the application;
in response to identifying the first trade data at the second time point, measure, by executing the monitoring process, second metric data associated with the first trade data identified at the second time point; and
in response to a latency value obtained based on the first metric data or the second metric data exceeding a latency threshold, send a latency alert to a user computing device associated with the application,
wherein the monitoring process is not a process of the application and is not linked with the first process or the second process, and
wherein the latency value obtained based on the first metric data or the second metric data indicates a latency of a queue between the first process executed by the one or more processors of the computing device and the second process executed by the one or more processors of the computing device.

16. The non-transitory computer readable medium according to claim 15, wherein in measuring the first metric data, the program instructions are configured to be executed by the one or more processors of the computing device to:
periodically access a first queue into which output data of the first process of the application are inserted and from which input data of the second process of the application are removed; and
determine, as a result of periodically accessing the first queue, that the first trade data is inserted in the first queue, and obtain the first metric data associated with first trade data at the first time point.

17. The non-transitory computer readable medium according to claim 16, wherein the program instructions are further configured to be executed by the one or more processors of the computing device to:
determine, as a result of periodically accessing the first queue, that the first trade data is removed from the first queue, and obtaining third metric data associated with first trade data at a third time point which is between the first time point and the second time point.

18. The non-transitory computer readable medium according to claim 15, wherein the first trade data includes a first tag.

19. The non-transitory computer readable medium according to claim 18, wherein in identifying the first trade data at the second time point, the program instructions are configured to be executed by the one or more processors of the computing device to:
periodically access a second queue into which output data of the second process of the application are inserted; and
determine, as a result of periodically accessing the second queue, that the first application including the first tag is inserted in the second queue.

20. The non-transitory computer readable medium according to claim 19, wherein the program instructions are further configured to be executed by the one or more processors of the computing device to:
determine, as a result of periodically accessing the second queue, that the first trade data including the first tag is removed from the second queue, and obtaining fourth metric data associated with first trade data at a fourth time point which is later than the second time point.

* * * * *